(12) United States Patent
Brüelle-Drews (10) Patent No.: US 8,442,239 B2
(45) Date of Patent: May 14, 2013

(54) AUDIO SYSTEM WITH BALANCE SETTING BASED ON INFORMATION ADDRESSES

(75) Inventor: Christian Brüelle-Drews, Hamburg (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1799 days.

(21) Appl. No.: 10/528,870

(22) PCT Filed: Jan. 23, 2003

(86) PCT No.: PCT/US03/01932
§ 371 (c)(1),
(2), (4) Date: Mar. 24, 2005

(87) PCT Pub. No.: WO2004/068730
PCT Pub. Date: Aug. 12, 2004

(65) Prior Publication Data
US 2005/0271219 A1     Dec. 8, 2005

(51) Int. Cl.
*H04B 1/00*     (2006.01)
(52) U.S. Cl.
USPC .......................................... 381/86; 381/109
(58) Field of Classification Search ............... 381/86, 381/56–57, 98, 107, 123, 110, 103–104, 381/94.4–94.5; 700/94; 345/173
See application file for complete search history.

(56) References Cited

U.S. PATENT DOCUMENTS

| | | | | |
|---|---|---|---|---|
| 5,661,811 A * | 8/1997 | Huemann et al. | ............. | 381/309 |
| 5,745,583 A * | 4/1998 | Koizumi et al. | ................ | 381/86 |
| 6,114,774 A * | 9/2000 | Fiegura | ......................... | 307/9.1 |
| 6,157,725 A * | 12/2000 | Becker | ............................ | 381/86 |
| 6,385,542 B1 | 5/2002 | Millington | ................... | 701/213 |
| 7,039,197 B1 * | 5/2006 | Venkatesh et al. | .............. | 381/86 |
| 7,190,798 B2 * | 3/2007 | Yasuhara | ........................ | 381/86 |
| 7,286,676 B2 * | 10/2007 | Kato et al. | .................... | 381/109 |
| 2001/0025376 A1 | 9/2001 | Knobl | | |
| 2001/0048749 A1 * | 12/2001 | Ohmura et al. | ................. | 381/86 |
| 2002/0067839 A1 * | 6/2002 | Heinrich | ....................... | 381/110 |
| 2004/0071304 A1 * | 4/2004 | Yanz et al. | ................... | 381/312 |

FOREIGN PATENT DOCUMENTS

| | | | |
|---|---|---|---|
| JP | 62-291300 | | 12/1987 |
| JP | 10-066189 | | 3/1998 |
| JP | 10066189 | * | 3/1998 |
| JP | 2000-197199 | | 7/2000 |
| JP | 2001-286000 | | 10/2001 |
| JP | 2002-354596 | | 12/2002 |

OTHER PUBLICATIONS

Patent Cooperation Treaty International Search Report, PCT/US03/01932, filed Jan. 23, 2003.
Japanese Office Action, dated Jun. 23, 2011, pp. 1-6, Japanese Patent Application No. 2008-326579, Japanese Patent Office, Japan.
Canadian Office Action dated Oct. 10, 2012, Canadian Application No. 2,498,392, 3 pgs.

* cited by examiner

*Primary Examiner* — Lun-See Lao
(74) *Attorney, Agent, or Firm* — Brinks Hofer Gilson & Lione (57) ABSTRACT

An audio system for a vehicle that includes a system for allowing an occupant of the vehicle to adjust a balance setting of each audio source (116). The audio system includes a plurality of audio sources (102) that are connected to an amplifier (104). The amplifier is connected to a head unit (106) that adjusts the balance setting of each audio source based on predetermined parameters or user preferences (112). Audio output signals from the audio sources are thus reproduced with different balance settings.

19 Claims, 6 Drawing Sheets

AUDIO SYSTEM WITH BALANCE SETTING BASED ON INFORMATION ADDRESSES

BACKGROUND OF THE INVENTION

1. Technical Field

This invention relates to vehicle audio systems and, more particularly, to a multi-channel audio system with a balance setting based on each type of audio source.

2. Related Art

Motor vehicles are currently being equipped with a wide range of audio sources. The audio sources are used for a wide range of audio, communication and driver information systems that provide varying types of acoustic information to occupants of the motor vehicle. For example, the audio sources can be used to generate acoustic driver recommendations from a navigation system, vocal instructions from a speech controlled system, audio outputs from different audio sources (radio tuner, CD/DVD player, MP3 player), traffic messages, telephone conversations and synthetic speech outputs for reading email to name a few.

The audio sources that are located in the motor vehicle may generate output signals that are meant for different listeners in the motor vehicle. For instance, whereas instructions from the navigation system and traffic messages are primarily of the driver's interest; a concurrently played CD for the children in the back seat of the vehicle is likely only of interest to the children sitting in a back seat for example. The driver or children may not want to interrupt the music being played from the CD with acoustic driver recommendations from the navigation system.

Currently, the balance setting of speakers in the motor vehicle can only be set concurrently for all audio sources. As such, a need exists for an audio system that is capable of having balance settings for each type of audio source that is used in the motor vehicle.

SUMMARY

A multi-channel audio system for a vehicle is disclosed that includes a menu-driven user interface for setting the speaker balance setting based upon the type of audio source that generates an audio output signal. The multi-channel audio system includes a plurality of audio sources that may be selected from a wide range of audio sources that are capable of being placed in the vehicle. The audio sources are connected to a head unit and an amplifier. The head unit is the component in the vehicle that is used for audio management. Software modules on the head unit allow the occupant to use the audio sources located in the vehicle and manage such things as balance and volume. The head unit allows an occupant of the vehicle to adjust the balance setting for a plurality of speakers based upon each audio source or type of audio source.

The head unit includes a user interface module and an audio manager module. The user interface module includes an application that generates a balance setting graphical user interface ("GUI") on a display of the multi-channel audio system. The balance setting GUI allows the occupant of the vehicle to adjust balance settings for each type of audio source that is capable of providing an audio output signal to the amplifier. The audio manager module is an application operable to set the balance setting in the amplifier for each audio source based upon the user's predefined settings.

The user interface also provides a passenger GUI that allows the user to setup the multi-channel audio system based on a passenger information address. In other words, the multi-channel audio system allows the user to adjust the balance setting based upon the location of certain types of passengers in the vehicle. The user can identify interest groups (driver, co-driver, children, backseat, etc.) and set the balance setting for each of these interest groups. For example, if the children normally sit in the backseat, the user can adjust the balance setting of each audio source that the children want to hear to reproduce audio outputs in only the rear loudspeakers or only in a selected subset of loudspeakers.

The amplifier is used to audibly reproduce outputs provided by the various audio sources on various combinations of loudspeakers that are located in the vehicle. The amplifier includes a balance setting circuit that allows the amplifier to control the balance settings of the output signals that are provided by the audio sources. The audio manager module controls the balance setting circuit in the amplifier to operate as defined by the occupant for each audio source or type of source.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
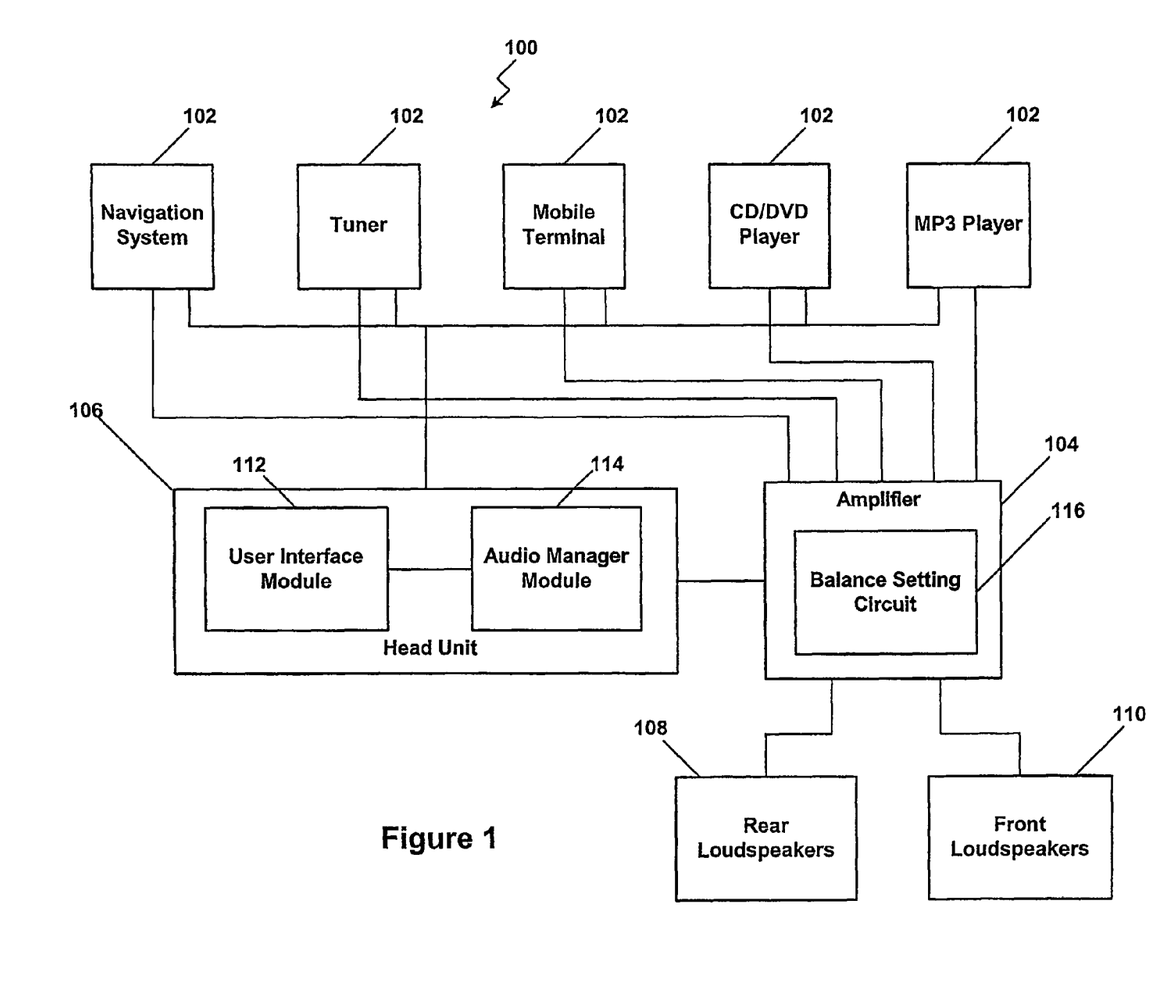
FIG. 1 is a block diagram of an audio system that includes a balance setting system for multiple audio sources.

FIG. 1 discloses a multi-channel audio system 100 for a vehicle that is capable of allowing an occupant of the vehicle to adjust and set speaker balance settings based on the type of audio source that is providing an output. The balance setting allows the multi-channel audio system 100 to reproduce audible output signals from each audio source in a predefined number of speakers in the vehicle. When more than one audio source is generating an output on the speakers, the multi-channel audio system 100 is capable of simultaneously applying multiple balance settings to the audio outputs that are generated on the speakers.

The multi-channel audio system 100 includes a plurality of audio sources 102 that are connected to an amplifier 104. A set of rear loudspeakers 108 and a set of front loudspeakers 110 are connected to the output of the amplifier 104. Additional sets of loudspeakers also could be connected to the output of amplifier 104. Several different types of audio sources may be used in the multi-channel audio system 100. The audio sources 102 may be selected from a group of audio sources including, but not limited to, a navigation system, a radio tuner, a mobile or remote terminal (telephone), a CD/DVD player, a Radio Data System (RDS) tuner, an Internet radio, a cassette player, a satellite radio, a text-to-speech system, a television tuner or an MP3 player. Some of the audio sources 102 are illustrated in FIG. 1, but other audio sources may be a part of the multi-channel audio system 100 as well.

The multi-channel audio system 100 also includes a head unit 106 that is connected to the amplifier 104. The head unit 106 may include a GUI module 112 that is operable to generate a GUI on a display. As set forth in greater detail below, the GUI module 112 is used by an occupant of the vehicle to adjust and set the balance settings of the rear and front loudspeakers 108, 110 and to review the balance settings that have already been programmed by the occupant and stored in the head unit 106. An audio manager module 114 is also included in the head unit 106 that is used to set the balance of the amplifier 104 for each respective audio source 102. In other embodiments, the head unit 106 may be connected to each one of the audio sources 102 or selected audio sources 102. This allows the head unit 106 to control operation of each of the audio sources 102.

The amplifier 104 includes a balance setting circuit 116 that sets the balance of the speakers 108, 110 based upon user settings that are input into the GUI 112. Although not illustrated, the amplifier 104 also includes control circuitry and amplification circuitry that are designed to audibly reproduce audio output signals in the loudspeakers 108, 110 based on the user defined balance settings for the audio sources 102. The audio manager module 114 is programmed to control the balance setting circuit 116 of the amplifier 104 based on the settings that are determined and input by an occupant of the vehicle.

Figure 2:
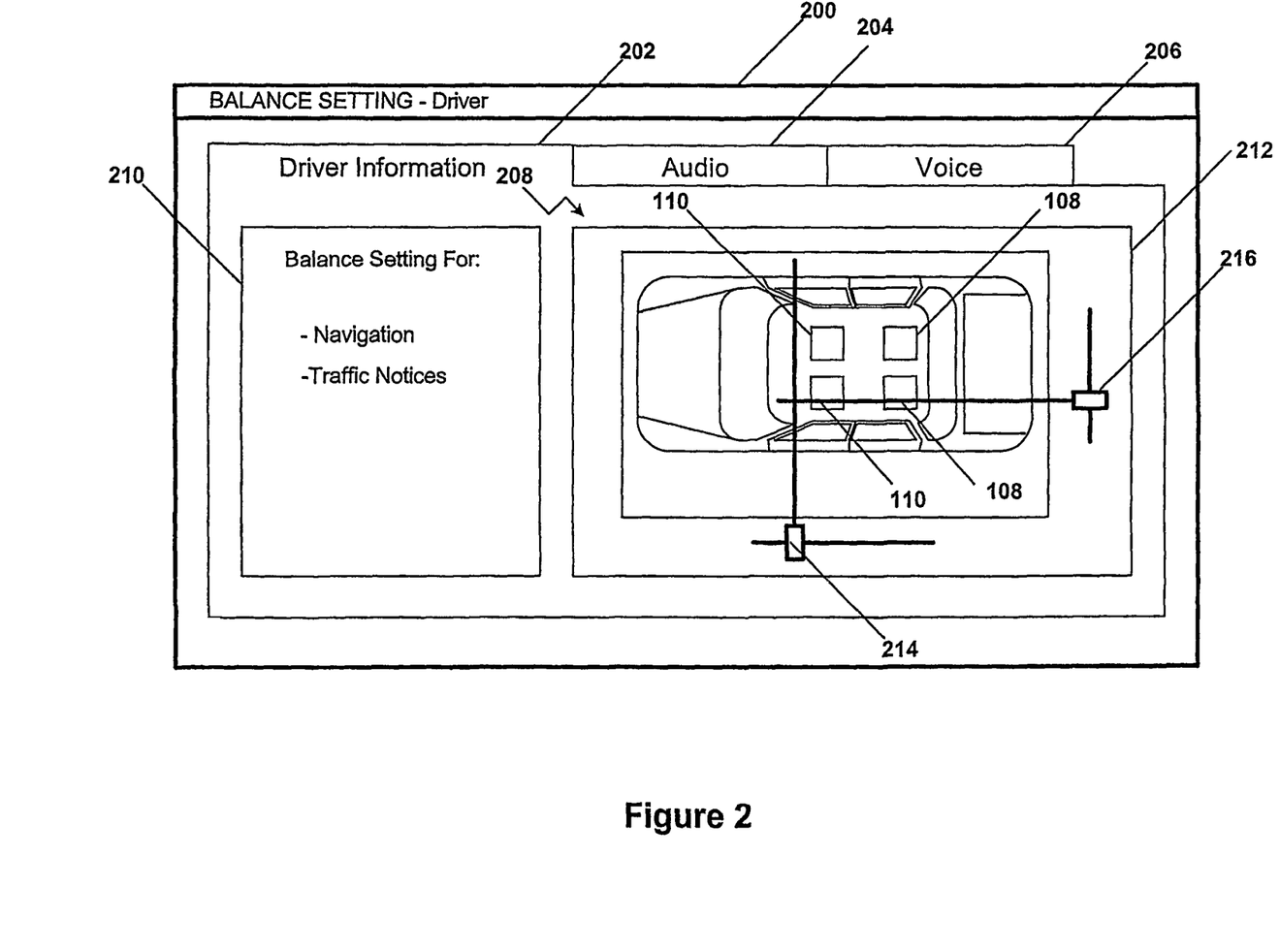
FIG. 2 is a GUI illustrating an example driver information screen.

In FIG. 2, an illustrative balance setting GUI 200 that may be generated by the GUI 112 is set forth. The balance setting GUI 200 illustrated is used to set the balance for the driver of the vehicle. The balance setting GUI 200 includes a driver information screen tab 202, an audio screen tab 204, and a voice screen tab 206. Although not specifically illustrated, the multi-channel audio system 100 includes a display that is used to display information to occupants of the vehicle or users of the multi-channel audio system 100. The display would be connected to the head unit 106. The display is preferentially a touch-screen display that allows the user to interact with settings that are generated on the display. Other mechanical adjustment instruments for controlling the balance setting options provided by the head unit 106 may also be used such as buttons, knobs or switches.

Activation of the driver information screen tab 202 brings up a driver information screen 208 that is generated by the GUI application or module of the user interface module 112. The driver information screen 208 includes a balance information GUI 210 and a balance setting GUI 212. The balance information GUI 210 includes a list of the respective audio sources 102 that are controlled by the settings contained in the balance setting GUI 212 of the driver information screen 208.

In the example in FIG. 2, the balance information GUI 210 of the driver information screen 208 includes all of the audio sources 102 in the multi-channel audio system 100 that provide acoustic driver recommendations to the driver. As illustrated, the balance information GUI 210 includes navigation acoustic driver recommendations that may be generated from the vehicle navigation system and traffic notices that may be generated by the RDS tuner. RDS is a series of enhancements for VHF and FM radio that started in Europe and migrated around the world. It provides a variety of features including a more precise way of tuning and an eight-character display of the station. For car radios, it provides traffic information as well as a way to tune in alternate frequencies for the same station.

The balance setting GUI 212 of the driver information screen 208 also includes a horizontal adjustment bar 214 and a vertical adjustment bar 216. An occupant of the vehicle can adjust the balance setting between the rear and front loudspeakers 108, 110, by using the horizontal adjustment bar 214. The vertical adjustment bar 216 is used to adjust the balance setting between the right-hand and left-hand side of the vehicle. In other words, the vertical adjustment bar is used to adjust the balance setting between the left and right loudspeakers of the rear and front loudspeakers 108, 110.

During operation, the occupant of the vehicle can adjust the balance setting by moving the horizontal and vertical adjustment bars 214, 216 to the desired location. For illustrative purposes only, the balance setting set forth in FIG. 2 has the audio outputs from the navigation system and the RDS tuner set to be audibly reproduced only on the driver side speaker. The horizontal and vertical adjustment bars 214, 216 may be adjusted to audibly reproduce acoustic driver recommendations on all of the speakers or just one of the speakers. The settings of the horizontal and vertical adjustment bars 214, 216 causes the audio manager module 114 to adjust the balance setting of the audio sources 102 such that the audio output signals that are generated by the various audio sources 102 are set to the balance setting reflected in the balance setting GUI 212.

Also in FIG. 2, the balance setting GUI 200 that is illustrated may be tailored to the driver of the vehicle. The multi-channel audio system 100 allows the balance setting to be setup based on passenger information addresses. The head unit 106 may be operable to allow the user of the multi-channel audio system 100 to set the balance setting for audio sources 102 for groups of interest, such as a driver, a co-driver or passenger, children, and adult passengers. Although not specifically illustrated, the GUI 112 may use a menu-based selection GUI to allow the user to select which group the balance setting GUI 200 is brought up during operation. Other selection methods for selecting the group of interest may also be used, such as buttons or knobs on the head unit 106.

Figure 3:
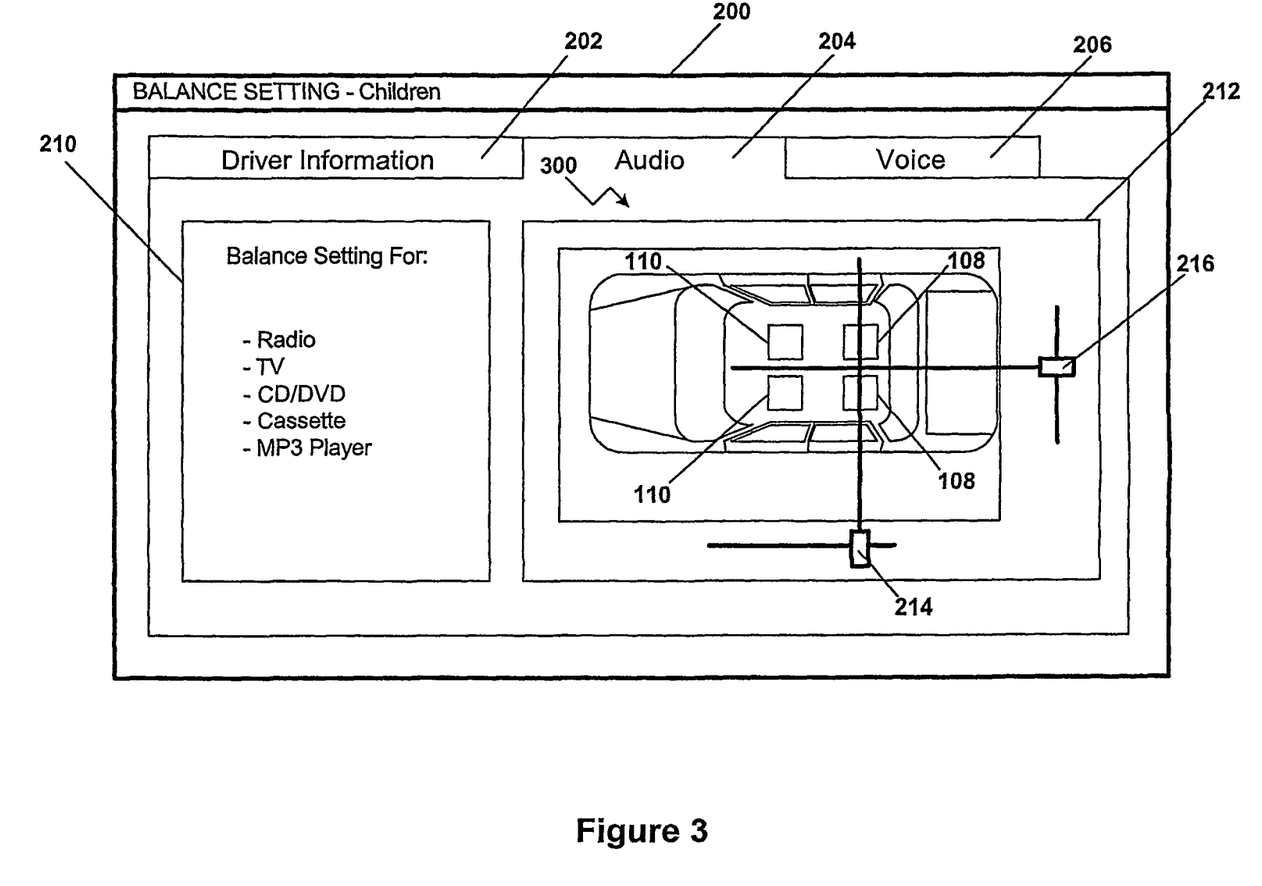
FIG. 3 is a GUI illustrating an example audio information screen.

FIG. 3 illustrates a balance setting GUI 200 that may be used by children. Selection of the audio screen tab 204 causes the user interface 112 of the head unit 106 to generate an audio information screen 300. The audio information screen 300 may control the balance settings for various audio sources 102 that are directed toward entertainment and not vehicle navigation or driver information. As illustrated, the balance information GUI 210 sets forth that the audio information screen 300 is used to control the balance setting for the tuner or radio, a television, a CD/DVD player, a cassette player and an MP3 player. As with the driver information screen 208, the horizontal and vertical adjustment bars 214, 216 of the balance setting GUI 212 are used to control and adjust the balance settings for the audio sources 102 that fall in this category. In the example set forth in FIG. 3, the balance setting is set to cause the multi-channel audio system 100 to audibly reproduce audible output signals from these audio sources 102 equally on both of the rear loudspeakers 108.

Although not illustrated, the voice screen tab 206 is used to set the balance setting of various voice-related audio sources 102. Selection of the voice screen tab 206 will generate a voice information screen. As with the examples set forth above, the horizontal and vertical adjustment bars 214, 216 of the balance setting GUI 212 are used to control and adjust the balance setting for the various audio sources 102 that fall in this category. Types of audio sources that fall in this category may be a mobile terminal or a text-to-speech system.

An occupant of a vehicle may adjust the balance settings for several audio sources 102 instead of having one balance setting for all audio sources 102. In addition, the balance setting for the audio sources 102 to be adjusted based on groups of interest. This allows the occupant of the vehicle to control what speakers audio outputs are generated on such that different speakers 108, 110 can be used for different audio sources 102. For example, the balance setting for a navigation system can be setup to only generate acoustic driver recommendations and information on a speaker close to the driver while the balance setting for a CD player can be setup to play audio outputs on speakers in the back seat where children may be located. The children may not want to hear the acoustic driver recommendations generated by the navigation system and may want music from the CD player to continue uninterrupted. Such capability is supplied to the multi-channel audio system 100 by providing balance settings for each audio source 102.

Figure 4:
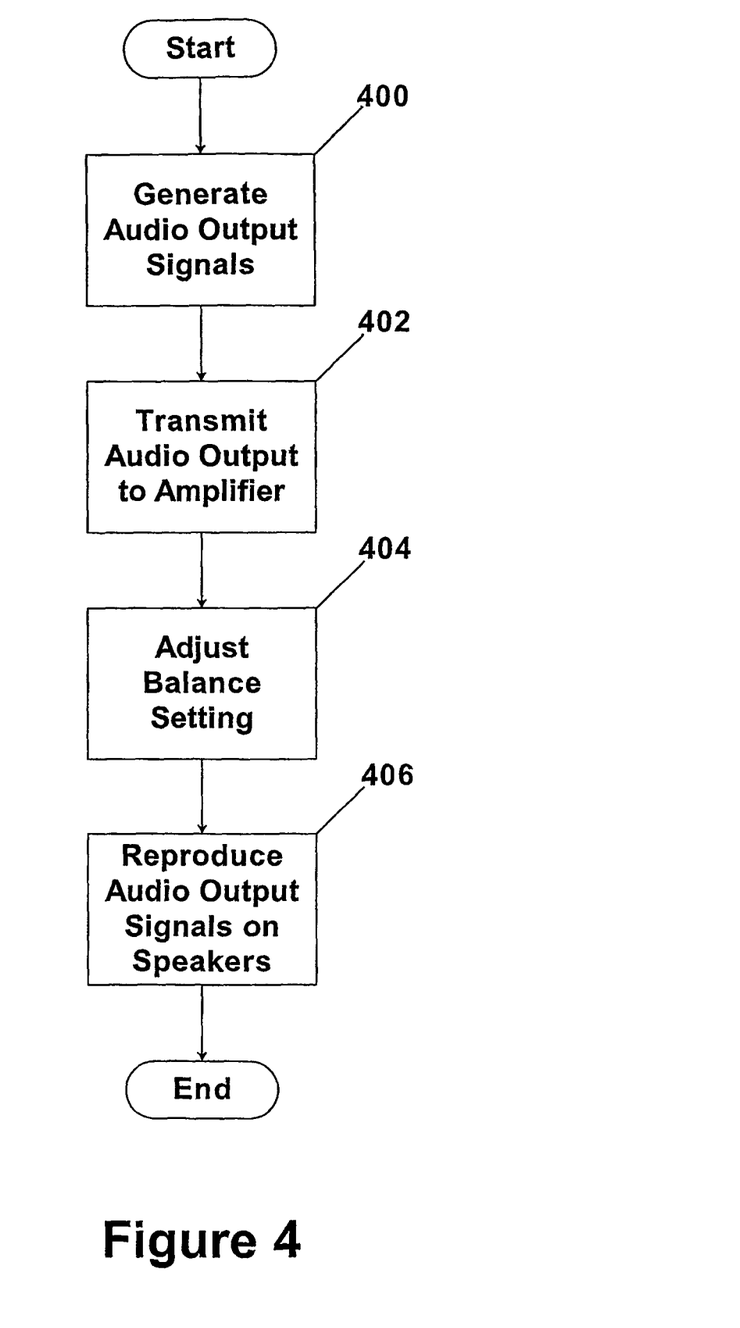
FIG. 4 is a block diagram illustrating the method steps taken to adjust balance settings in the audio system.

FIG. 4 is a block diagram that sets forth steps that may be taken by the multi-channel audio system 100 to control the balance settings of the audio sources 102 in the multi-channel audio system 100. At step 400, the audio sources 102 generate a plurality of audio output signals. After the audio output signals are generated by the audio sources 102, they are transmitted to the amplifier 104, as is illustrated at step 402. The head unit 108 is used to adjust the balance settings for the audio output signals that are generated by the audio sources 102 and provided to the amplifier 104 at step 404. After the balance settings are adjusted for the audio output signals, they are reproduced on speakers 108, 110 according to the balance settings that are controlled by the head unit 106, as is illustrated at step 406.

Figure 5:
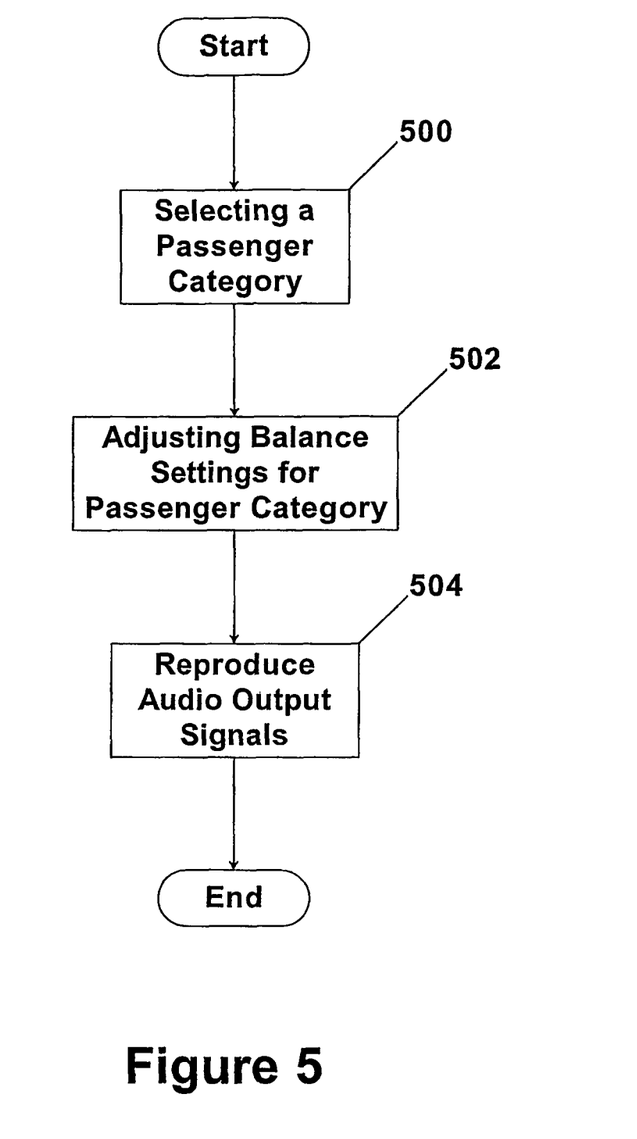
FIG. 5 is a block diagram illustrating the method steps taken to adjust balance settings in the audio system based on passenger categories.

Referring to FIG. 5, another block diagram is set forth illustrating the steps that may be taken to adjust the balance settings of the audio sources 102 based upon passenger categories. At step 500, the user or driver of the vehicle selects a passenger category using the head unit 106. The passenger category may be selected using the balance setting GUI 200 that is generated by the head unit 106. At step 502, the user or driver of the vehicle adjusts the balance setting for the selected passenger category. Once the balance settings are adjusted, the audio output signals may be reproduced on the speakers 108, 110 according to the balance settings that are supplied by the user for that category, as is illustrated at step 504.

Figure 6:
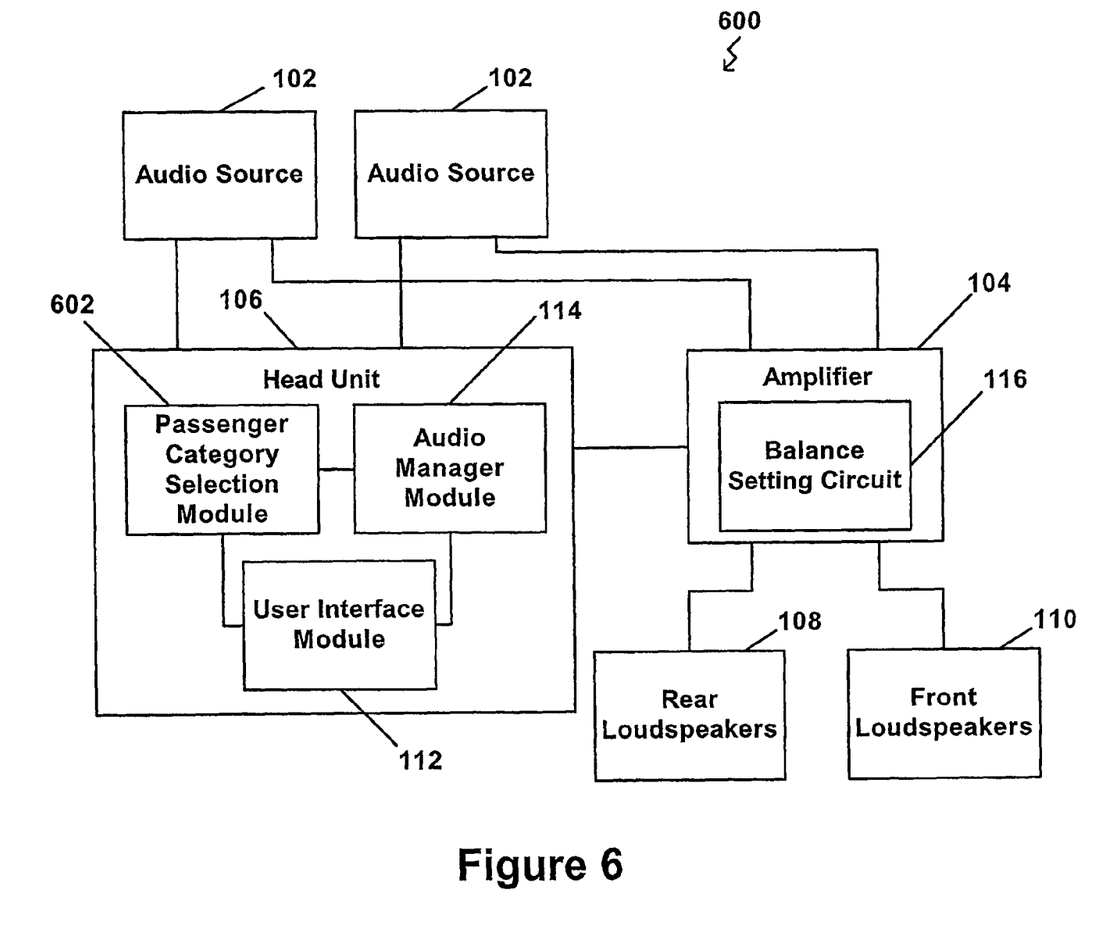
FIG. 6 is a block diagram of an audio system that includes a balance setting system for multiple audio sources based on passenger categories.

FIG. 6 depicts yet another embodiment including a multi-channel audio system 600 for use in a vehicle. The multi-channel audio system 600 includes a plurality of audio sources 102 that are connected to an amplifier 104 and a head unit 106. The head unit 106 is also connected to the amplifier 104. A passenger category selection module 602 located on the head unit 106 is used to allow a user to select a passenger category. An audio manager module 114 located on the head unit 106 is used for adjusting a balance setting of a plurality of speakers 108, 110 for the selected passenger category based on a-respective audio source 102 that generates an audio output signal.

The user may select a passenger category to correspond to seating locations in the vehicle. As such, the passenger categories that may be selected to include, for example, a driver category, a passenger category, and a children category. The passenger category selection module 602 allows the user to navigate through a balance setting GUI 200 that is generated for each passenger category in a similar manner set forth above. After the user selects a passenger category, the balance setting GUI 200 for that particular passenger category may be used to adjust the balance settings for the audio sources as with previous embodiments. Once the balance settings are set by the user, the predefined user balance settings are stored in the head unit 106. Unless the balance settings are adjusted again, each time the multi-channel audio system 600 is turned on the head unit 106 will revert to the saved balance settings.

As set forth above, some of the audio output signals may be driver information messages that are generated by the navigation system. The audio signals from other audio sources may be muted or reduced when driver information messages are generated and played to occupants of the vehicle. The audio signals may be muted or reduced in the speaker nearest the driver of the vehicle, or in any combination of speakers.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An audio system for use in a vehicle, comprising:
a plurality of audio sources connected to an amplifier in communication with a plurality of speakers, where each of the audio sources is operable to generate an audio output signal for receipt by the amplifier;
a control unit connected with the amplifier, the control unit configured to store in a memory a plurality of passenger categories;
the control unit further configured to store a plurality of balance settings in the memory, where each of the balance settings is for one of the plurality of audio sources and is stored in one of the plurality of passenger categories so that no passenger category contains more than one balance setting for each of the audio sources;
a user interface in communication with the control unit, the user interface configured to select one of the audio sources from among the plurality of audio sources as a selected audio source;
the control unit further configured to retrieve, in response to receipt of the selection of the selected audio source, a balance setting for the selected audio source from among the balance settings stored in a selected one of the plurality of passenger categories; and
the amplifier further configured to reproduce the audio output signal of the selected audio source based upon the retrieved balance setting stored in the selected passenger category to drive the speakers of the audio system.

2. The audio system of claim 1 where the user selected audio source comprises one audio source from a group of audio sources including a navigation system, a tuner, a remote terminal, a compact disc player, a digital video disc player, an MP3 player, a radio data service tuner, a television, a satellite radio, an Internet radio, a cassette player, and a text-to-speech system.

3. The audio system of claim 1, where the plurality of passenger categories include a driver category, a co-driver category, a backseat passenger category and a children category.

4. The audio system of claim 1, where a second balance setting for one of the plurality of audio sources is stored in a second passenger category of the plurality of passenger categories;
   where the user interface is further configured to receive a selection of the second passenger category of the plurality of passenger categories;
   where the control unit is further configured to retrieve the balance setting for the selected audio source stored in the second passenger category; and
   where the control unit is operable to setup the amplifier to reproduce the audio output signal generated by the selected audio source based upon the balance settings stored in the second passenger category.

5. The audio system of claim 1, where the user interface is further configured to receive an adjustment to the balance setting for a selection audio source to create an updated balance setting for the selected audio source; and
   where in response to creation of the updated balance setting, the control unit is further configured to store the updated balance setting in the set of balance settings stored in the selected passenger category as the balance setting for the selected audio source in the selected passenger category.

6. The audio system of claim 1, where the selected passenger category is a first passenger category and the set of balance settings stored in the first passenger category is for a first audio source, and where the user interface is further configured to receive a selection of a second passenger category from among the plurality of passenger categories;
   in response to receipt of the selection of the second passenger category, the control unit if further configured to retrieve a new balance setting for the selected audio source from a second set of balance setting stored in the second passenger category; and
   where the control unit is operable to setup the amplifier to reproduce the audio output signal generated by the selected audio source based upon the new balance settings retrieved from the second set of balance settings.

7. A method of controlling an audio system in a vehicle, the system having a plurality of audio sources, a plurality of speakers, a memory, and a user interface, the method comprising:
   storing in the memory a plurality of passenger categories;
   storing a plurality of balance settings in the memory, where the balance settings for the audio sources are stored in the plurality of passenger categories so that no passenger category contains more than one balance setting for each of the audio sources;
   through the user interface of the audio system, selecting one of the audio sources as a selected audio source;
   retrieving the balance setting for the selected audio source from the balance settings stored in a selected one of the passenger categories in the memory;
   generating an audio output signal for reproduction from the selected audio source; and
   reproducing the audio output signal of the selected audio source in an amplifier to drive the speakers based upon the stored selected balance setting for the selected audio source retrieved from the selected passenger category in the memory.

8. The method of claim 7 where the user interface includes a graphical user interface configured to receive a selected balance setting of a selected audio source from an occupant of the vehicle, where each audio source can be associated with a respective audio source balance setting.

9. The method of claim 7 where at least one audio source is selected from a group of audio sources including a navigation system, a tuner, a remote terminal, a compact disc player, a digital video disc player, an MP3 player, a radio data service tuner, a television, a satellite radio, an Internet radio, a cassette player and a text-to-speech system.

10. The method of claim 7, further comprising:
    through the user interface of the audio system, selecting one of the plurality of passenger categories as the selected passenger category.

11. The method of claim 10, further comprising:
    through the user interface of the audio system, adjusting the balance setting of a selected audio source to create an updated balance setting;
    storing the updated balance setting for the selected audio source in one of the passenger categories; and
    reproducing the audio output signal to drive the speakers based upon the updated balance setting.

12. The method of claim 10, where the audio source selected as the selected audio source is a first audio source operating at a balance setting from the selected passenger category, the method further comprising:
    through the user interface of the audio system, receiving a new selection of a second audio source from among the plurality of audio sources as the selected audio source;
    in response to the new selection of the second audio source as the selected audio source, retrieving the balance setting for the second audio source from a second passenger category stored in the memory other than the selected passenger category;
    in further response to the new selection of the second audio source as the selected audio source, the second audio source generating an audio output signal as the selected audio source; and
    reproducing the audio output signal of the second audio source to drive the speakers bases upon the balance setting for the second audio source stored in the second passenger category.

13. The method of claim 10, where the passenger category selected as the selected passenger category is a first passenger category and the set of balance settings stored in the selected passenger category is a first set of balance settings, the method further comprising:
    through the user interface of the audio system, selecting a second passenger category from among the plurality of passenger categories;
    in response to receipt of the selection of the second passenger category, retrieving a second balance setting of the selected audio source stored in the second passenger category; and
    reproducing the audio output signal to drive the speakers based upon the second balance setting for the selected audio source stored in the second passenger category.

14. A computer readable medium including instructions executable on a processor of an audio system adapted to be installed in a vehicle having a plurality of audio sources, an amplifier, a plurality of speakers, a memory, and a user interface, the computer readable medium comprising:
    computer program code stored on the computer readable medium to store in the memory a plurality of passengers categories;
    computer program code stored on the computer readable medium to enable the memory to store a plurality of balance settings, where each of the balance settings is for one of the plurality of audio sources and is stored in one of the plurality of passenger categories so that no passenger category contains more than one balance setting for each of the audio sources;

computer program code stored on the computer readable medium to enable the user interface of the audio system to receive a selection of one of the audio sources from among the plurality of audio sources as a selected audio source;

computer program code stored on the computer readable medium, in response to the selection of the selected audio device, to enable the processor to retrieve from the memory a balance setting for the selected audio source stored in a selected passenger category of the plurality of passenger categories; and computer program code stored on the computer readable medium to enable the processor, in further response to the selection of the selected audio source, to setup the amplifier to drive the speakers of the vehicle to reproduce an audio output signal of the selected audio source based upon the retrieved balance setting.

15. The computer readable medium of claim 14, further comprising:

computer program code stored on the computer readable medium to enable the user interface to select one of the passenger categories as the selected passenger category.

16. The computer readable medium of claim 15, further comprising:

computer program code stored on the computer readable medium to enable the user interface to receive an adjustment for the balance setting of the selected audio source to create an updated balance setting;

computer program code stored on the computer readable medium to enable the memory to store the updated balance setting in the selected passenger category; and computer program code stored on the computer readable medium to enable the amplifier to drive the speakers based upon the updated balance setting.

17. The computer readable medium of claim 14, further comprising:

computer program code stored on the computer readable medium to enable the user interface to receive a new selection of a second passenger category from among the plurality of passenger categories;

computer program code stored on the computer readable medium to enable the processor, in response to the receipt of the new selection of the second passenger category, to retrieve from the memory a balance setting for the selected audio source stored in the second passenger category from among the plurality of balance setting stored in the memory; and computer program code stored on the computer readable medium to enable the processor, in further response to the new selection of the second passenger category, to configure the amplifier to drive the speakers to reproduce an audio output signal for the selected audio source based upon the balance setting for the selected audio device stored in the second passenger category.

18. The computer readable medium of claim 14, where the plurality of passenger categories include a driver category, a co-driver category, a backseat passenger category and a children category.

19. The computer readable medium of claim 14, where the plurality of audio sources includes at least one audio source is selected from a group of audio sources including a navigation system, a tuner, a remote terminal, a compact disc player, a digital video disc player, an MP3 player, a radio data service tuner, a television, a satellite radio, an Internet radio, a cassette player and a text-to-speech system.

\* \* \* \* \*